(12) United States Patent
Rickert

(10) Patent No.: US 7,234,291 B2
(45) Date of Patent: Jun. 26, 2007

(54) DRIVE TRAIN FOR A HEADER OF A HARVESTING MACHINE

(75) Inventor: Clemens Rickert, Stadtlohn (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/761,035

(22) Filed: Jan. 20, 2004

(65) Prior Publication Data

US 2004/0163374 A1    Aug. 26, 2004

(30) Foreign Application Priority Data

Jan. 24, 2003    (DE) ............................... 103 02 692

(51) Int. Cl.
*A01D 67/00*    (2006.01)
(52) U.S. Cl. ......................................... 56/209; 56/12.6
(58) Field of Classification Search .................. 56/17.1, 56/DIG. 9, 12.6, 13.5, 14.7–15.3, 15.6–15.9, 56/208, 209, 212
See application file for complete search history.

(56) References Cited

U.S. PATENT DOCUMENTS

| | | | | |
|---|---|---|---|---|
| 3,008,724 A | * | 11/1961 | Alvin et al. ............. | 280/6.156 |
| 3,174,266 A | | 3/1965 | Hoeksema | |
| 3,535,859 A | | 10/1970 | Adams | |
| 3,585,789 A | * | 6/1971 | Blanshine et al. ............. | 56/98 |
| 3,675,404 A | * | 7/1972 | Izakson ........................ | 56/209 |
| 3,731,470 A | * | 5/1973 | Cornish et al. ............... | 56/10.4 |
| 3,808,783 A | * | 5/1974 | Sutherland et al. ........... | 56/106 |
| 4,009,556 A | * | 3/1977 | Molzahn ...................... | 56/10.7 |
| 4,147,016 A | * | 4/1979 | Jensen et al. ................. | 56/15.8 |
| 4,227,366 A | | 10/1980 | Pucher | |
| 4,409,780 A | * | 10/1983 | Beougher et al. ............. | 56/228 |
| 4,487,004 A | * | 12/1984 | Kejr ........................... | 56/14.4 |
| 4,512,139 A | | 4/1985 | Musser et al. | |
| 4,972,664 A | * | 11/1990 | Frey ............................ | 56/13.6 |
| 5,527,218 A | * | 6/1996 | Van den Bossche et al. . | 460/20 |
| 6,370,853 B1 | | 4/2002 | Randall et al. .............. | 56/14.2 |
| 6,510,680 B2 | * | 1/2003 | Uhlending et al. ........... | 56/208 |
| 6,705,067 B2 | * | 3/2004 | Schroeder et al. ........... | 56/14.6 |

FOREIGN PATENT DOCUMENTS

| | | |
|---|---|---|
| CH | 434 849 | 4/1967 |
| DE | 35 22 699 | 1/1987 |
| DE | 199 18 550 | 10/2000 |
| DE | 199 18 550 A1 | 10/2000 |
| DE | 100 18 211 A1 | 11/2001 |
| DE | 100 30 330 A1 | 1/2002 |

* cited by examiner

*Primary Examiner*—Thomas B. Will
*Assistant Examiner*—Alicia Torres

(57) ABSTRACT

A drive train for a header of a harvesting machine. The harvesting machine has a main frame on which a feeder house is mounted. On the front face of the feeder house a mounting device is provided which is pivots with respect to the main frame about a fore/aft extending axis. A header is releasably fixed to the mounting device. The drive train for the header comprises a header drive shaft mounted to the mounting device driving a secondary drive shaft mounted on the header.

5 Claims, 3 Drawing Sheets

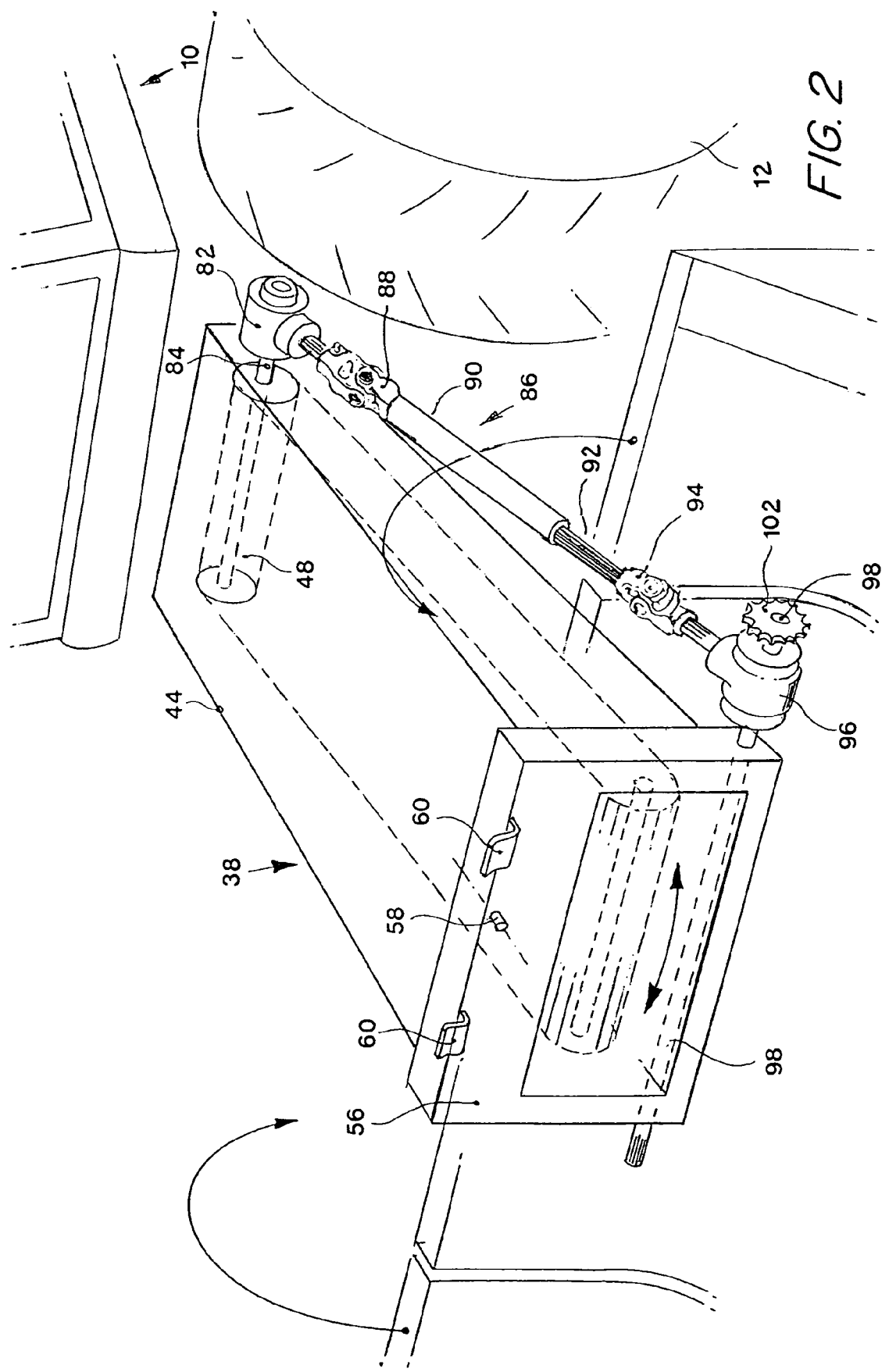

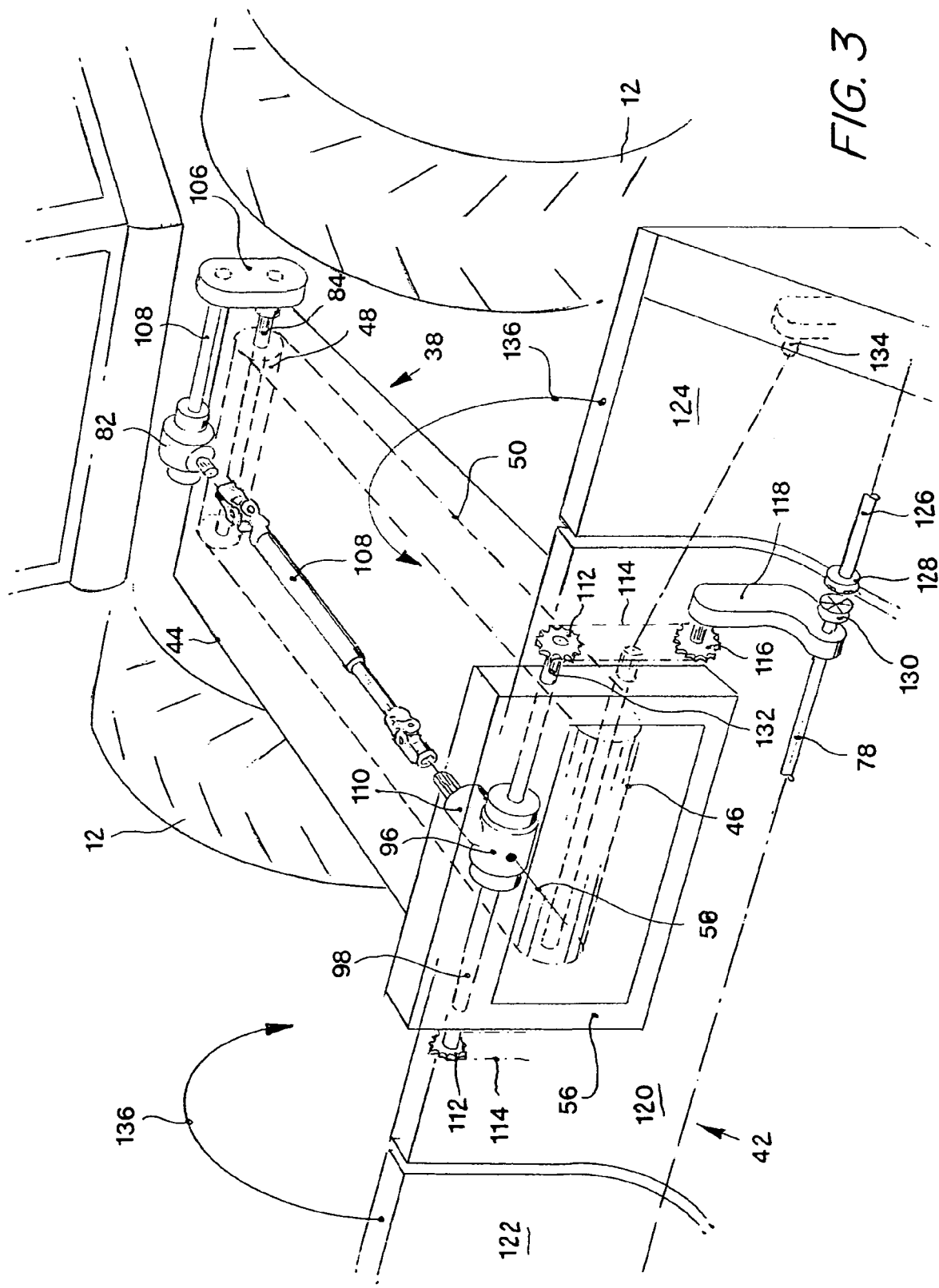

DRIVE TRAIN FOR A HEADER OF A HARVESTING MACHINE

FIELD OF THE INVENTION

The present invention is directed to a drive train for a header of a harvesting machine wherein a movable device is mounted to the front face of the feeder house and the header drive shaft is mounted to the movable device.

BACKGROUND OF THE INVENTION

In the state of the art, cutting systems for combines are usually driven by drive shafts, which extend between a header drive shaft, which is coupled to the lower feeder house roller, and one or both lateral ends of the header, i.e., essentially perpendicular to the direction of travel (see DE 199 18 550 A). In particular, drive shafts that can telescope are used if the cutting system is to complete a pendulum-like motion about a horizontal axis in the direction of travel on its suspension on the feeder house. Before the cutting system can be separated from the combine for transport, the drive shaft is manually removed from the feeder house and reattached before receiving another header, which represents a significant expense of time.

A few types of headers, particularly for harvesting corn, are provided with side parts, which can swing upwards into a transport position and which are articulated at a center part. For these headers, usually a drive shaft that can telescope extends between the header drive shaft of the feeder house and the outer edge of the center part. The drive shaft drives a drive shaft of the center part, which is in drive connection with the individual feeding and picking devices. The drive shafts of the side parts are connected, in turn, through releasable couplings to the drive shaft of the center part. When the outer parts are swung upwards, the couplings automatically decoupled. They automatically close again when the parts are swung down. Due to the rather small amount of available space, particularly for swinging headers, which are attached to a combine, it can be considered a disadvantage that the drive shaft must provide a relatively large area for changes in angle and length. Therefore, rather complicated and cost intensive drive shafts are required.

For other embodiments, the feeder house is coupled by short shafts to releasable couplings of the header, which are connected to drive shafts. The drive shafts drive the side parts, which, in turn, are in drive connection through other releasable couplings with the driven devices of the center part. When the side parts are swung upwards, the couplings are automatically separated. However, such headers cannot execute a pendulum-like motion. In turn, for other embodiments, a drive shaft that can telescope is provided between the feeder house and the outer sides. This does enable a pendulum-like motion, but requires manual removal of the drive shaft before the side parts can be moved into the transport position.

A drive train for the row units of a corn picker are described in U.S. Pat. No. 6,370,853 B. An angular gear, from which a shaft extends forwards to the corn picker, is attached to an output shaft mounted on the front side of the feeder house and extending perpendicular to the direction of travel of the combine. There the shaft drives a shift transmission via an angular gear. The shift transmission, in turn, drives the main drive shaft running perpendicular to the direction of travel via an angular gear articulated to the picker so that it can swing. Pendulum-like motion of the corn picker on the feeder house is not mentioned and would also not be possible due to the gear arrangement.

SUMMARY OF THE INVENTION

It is an object of the present invention to provide an improved drive train for a header.

It is proposed to attach the header drive shaft to a mounting device, on which the header can be mounted. Thus, the header drive shaft can move in common with the mounting device and the header relative to the main frame of the harvesting machine.

In this way, the drive connection between the harvesting machine and the header is independent of the motion of the header and the mounting device. The drive connection between the header drive shaft of the harvesting machine and the drive shaft of the header can be configured relatively simply. For this purpose, a telescoping drive shaft is no longer absolutely necessary.

The header drive shaft can extend horizontal and perpendicular to the direction of travel of the harvesting machine, similar to conventional drive trains for headers. Therefore, there is also the ability to operate the harvesting machine with conventional headers, whose drive shafts can be coupled with the header drive shaft. However, other arbitrary orientations of the header drive shaft would also be possible.

The header drive shaft is usually driven by self-propelled harvesting machines (or machines connected to tractors). Here, preferably a connection shaft is used, which extends from a harvesting machine drive shaft along the direction of travel up to a drive connection with the header drive shaft. It would also be conceivable to use some other torque transmission device, like a traction gear (e.g., chain, pulley, or toothed belt) or a hydrostatic gear, instead of the aforementioned connection shaft.

In order to allow the main frame of the harvesting machine to be kept horizontal while harvesting on terrain inclined transverse to the direction of travel, it may be provided with slope equipment that adjust the wheels relative to the main frame, while aligning the header parallel to the ground. It is important to articulate the mounting device on the feeder house of the harvesting machine so that it can pivot about a pendulum axis extending at least approximately in the direction of travel. The pendulum axis can be located under or above the feeding channel for the crops in the feeder house. By using suitable supports (rollers or the like) and guiding elements, the pendulum axis can also be located in the center of the feeding channel. As an alternative or in addition, the feeder house is hinged to the chassis of the harvesting machine so that it can pivot relative to the main frame.

For such embodiments, there are several possibilities for realizing the drive of the header drive shaft. In one embodiment, a connection shaft, which produces a drive connection between a harvesting machine drive shaft and the header drive shaft, is arranged coaxial to the pendulum axis. In this embodiment, the distance between the harvesting machine drive shaft and the header drive shaft always remains constant, independently of the pendulum angle, so that, in principle, the use of a telescoping shaft at this location can be eliminated.

In another embodiment, the connection shaft is arranged between the harvesting machine drive shaft and the header drive shaft at a distance from the pendulum axis. Here, a drive shaft of variable length can be used, i.e., a telescoping drive shaft.

Because the header drive shaft and/or the harvesting machine drive shaft extend perpendicular to the direction of travel of the harvesting machine for different embodiments of the invention, while the connection shaft connected on the drive side extends in the direction of travel, an angular gear is used between the connection shaft on one side and the header drive shaft and/or the harvesting machine drive shaft on the other side. Such an angular gear can be configured from conical gear wheels or a worm and can thus include an engaging gear.

The invention can be used in any harvesting machine, such as field choppers, cotton pickers, or combines. They can be used with special significance in hillside and sidehill combines having slope equipment. In particular, the advantage is that there is the ability to connect on the drive side the header drive shaft to a center part of a header, which has a side part that can be moved into the transport position. Therefore, although there is a sufficient range of angles for the motion of the header relative to the harvesting machine, the side part can be brought into the transport position without manually removing a drive shaft or the like.

BRIEF DESCRIPTION OF THE DRAWINGS

FIG. 2 is a perspective, schematic view of a first embodiment of a drive train for the header from FIG. 1.

FIG. 3 is a perspective, schematic view of a second embodiment of a drive train for the header from FIG. 1.

DETAILED DESCRIPTION

Figure 1:
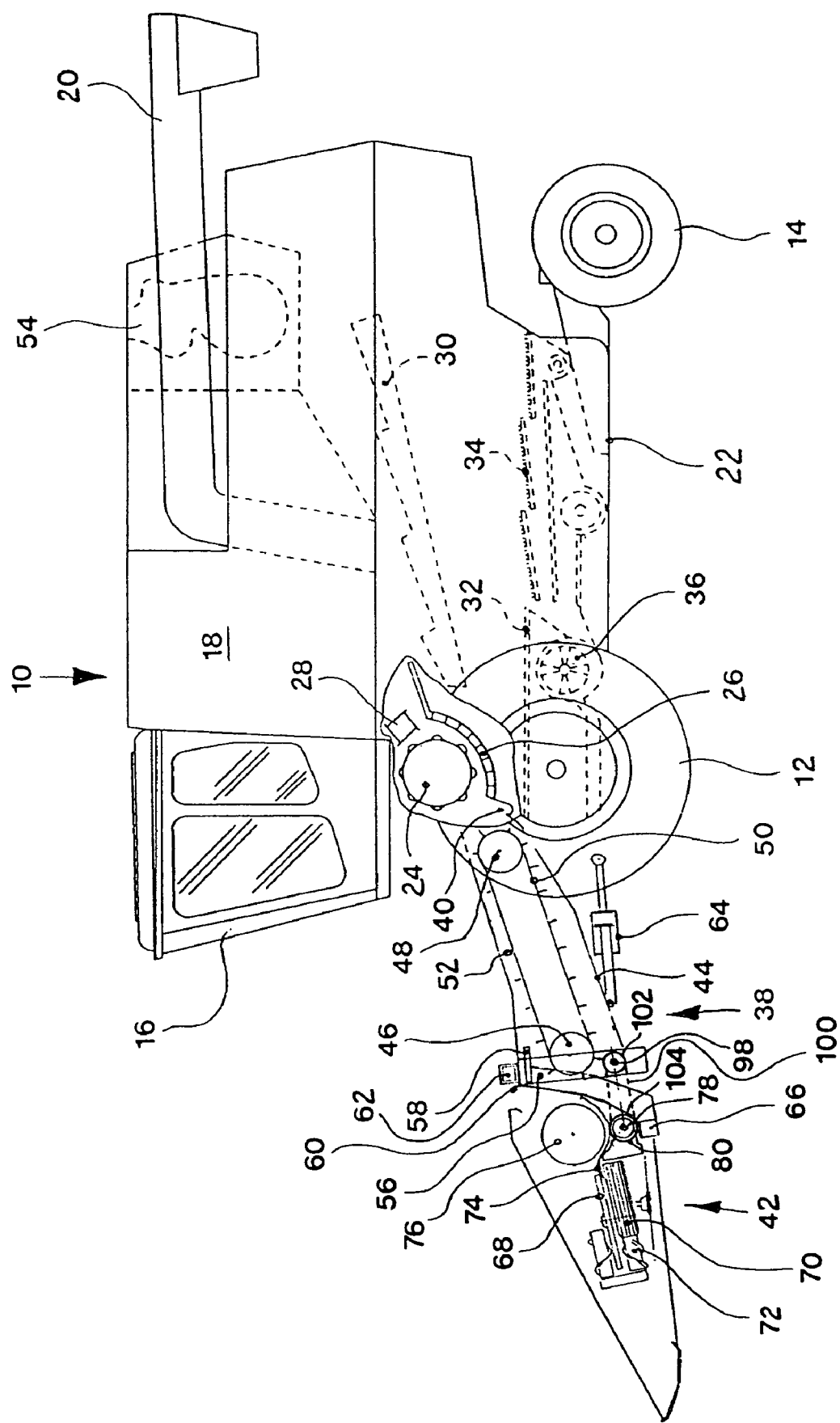
FIG. 1 is a schematic, partially cutaway side view of a combine with a header.

A harvesting machine shown in FIG. 1 in the form of a combine 10 is supported on front-wheel drive and rear-wheel steering wheels 12 and 14, respectively, and has a driver cabin 16, from which the machine can be operated by a driver. A grain tank 18 is located behind the driver cabin 16. The grain located in the grain tank 18 can be discharged therefrom by a discharge auger 20. The driver cabin and the grain tank 18 are supported on a frame 22. Harvested crop material is broken down into large and small components by a threshing assembly comprising a threshing cylinder 24, a threshing concave 26 and a beater 28. Trapped grain is separated from the threshed crop mat by a separating assembly comprising the illustrated straw walkers 30. The large non-grain crop components of the separated crop mat are expelled over the rear of the straw walkers 30 out the rear of the combine. Grain and chaff falling from the threshing assembly and the separating assembly are directed to a grain pan 32 and from the grain pan 32 to sieves 34. An air blast from cleaning fan 36 blows the chaff from the sieves out the rear of the combine 10. The clean grain is collected on the floor of the combine and transported by elevators, not shown, to the grain tank 18.

A header 42 gathers crop material lying or standing on the ground and feeds the crop material to a feeder house 38 which feeds the crop material to the threshing assembly. The feeder house is provided with a stone catching trap 40. The feeder house 38 contains within its housing 44 a lower feeder house roller 46 and a top feeder house roller 48, around which the conveyor chain 50 with carriers 52 runs. The top feeder house roller 48 as well as the threshing assembly and separating assembly are driven by an internal combustion engine 54 in a known way.

At the front side of the feeder house 38 there is a so-called pendulum shield 56. The pendulum shield 56 is a rectangular frame, which is connected to the front side of the housing 44 of the feeder house 38 so that it can rotate about an approximately horizontal pivoting or pendulum axis 58 extending in the direction of travel. It is used as an attachment device, to which a frame 66 of the header 42 can be attached in a removable way.

Several holder elements 60 in the form of hooks projecting forward and upward are attached at the top side of the pendulum shield 56. A crossbeam 62 of the frame 66 of the header 42 also lies on the top side of the pendulum shield 56. The holder elements 60 prevent the crossbeam 62 of the header 42 from skidding forward from the pendulum shield 56. The header 42 is also connected to the bottom side of the pendulum shield 56 so that it can be detached by locking elements (not shown in the drawing).

The header 42 can be removed in a known way from the pendulum shield 56 by laying it down on a base, releasing the locking elements, and lowering the feeder house 38 further reducing the length of the hydraulic cylinder 64, 50 that the holder elements 60 can be pulled backwards below the crossbeam 62. The header 42 is reattached in the reverse sequence.

The header 42 can be a corn picker as illustrated in FIG. 1. The corn picker comprises a series of feeding and picking units, which are supported on the frame 66, which is connected to the crossbeam 62. The header 42 has several feeding and picking devices, which are used for pulling in plants and for separating their cobs. The feeding and picking devices each include a feeding element 68, which can be set into rotation about an approximately vertical axis, as well as pairs of picking rolls 70 arranged underneath, each of which is equipped with augers 72 in their front region.

During operation, the feeding elements 68 grab plants standing in the field and guide them in interaction with the augers 72 into a picking gap. There, the plants are pulled downwards and the cobs are separated by means of the picking gap. The feeding elements 68 feed the grains to a cover 74 and a cross auger 76, which guides them to the center of the header 42. There they are expelled backwards through a center opening in the pendulum shield 56 and fed to the threshing assembly by the carrier 52 of the conveyor chain 50 of the feeder house 38.

The moving elements of the header 42 are driven by a transversely extending drive shaft 78 which drives the individual feeding and picking devices by associated angular gears 80.

In FIG. 2, the drive train for the header 42 is shown in perspective. It includes a first angular gear 82, through which the shaft 84 of the top feeder house roller 48 extends, as the harvesting machine drive shaft. The housing of the first angular gear 82 is connected rigidly to the housing 44 of the feeder house 38. On the driven side, the first angular gear 82 drives a telescoping drive shaft 86, which extends forwards and diagonally downwards from the first angular gear 82 and which is used as a connection shaft. The telescoping drive shaft 86 is provided with a first universal joint 88, a sleeve 90 with non circular inner cross section, a rod 92 arranged in the sleeve 90 so that it can move in the axial direction with an outer cross section corresponding to the inner cross section of the sleeve 90, as well as a second universal joint 94. The second universal joint 94 is operatively coupled to the input shaft of a second angular gear 96. A header drive shaft 98 running horizontal and perpendicular to the direction of travel extends through the second angular gear 96. The header drive shaft 98 extends on both sides of the pendulum shield 56. The housing of the second angular gear 96 is mounted on the pendulum shield 56 and the header drive shaft 98 is housed and supported on the pendulum shield so that it can swing with the sheild. On each end of the header drive shaft 98 there is a pinion 102, around which the chain 100 runs, which also runs around a pinion 104, which is attached to the drive shaft 78. Instead of the chain drive between the header drive shaft 98 and the drive shaft 78, there can be a belt or a drive with engaging toothed wheels or a drive shaft or some other drive connection.

During harvesting, the header 42 remains aligned parallel to the ground. The header 42 is supported on skids or is guided by an active system with sensors and actuators (including the hydraulic cylinder 64 as well as another hydraulic cylinder, which pivots the pendulum shield 56 about the pendulum axis 58) at a constant distance or with a defined contact force on the ground, as is known in the art.

The combine 10 is equipped with slope responsive equipment, which acts to adjust the position of the wheels 12 relative to the frame 22, such that the frame 22 always remains level. Thus, if the combine 10 harvests along a slope, the wheels 12 on the higher side of the slope are moved upwards and the wheels 12 on the lower side of the slope are moved downwards relative to the frame 22. The swinging, suspended rear wheels 14 must follow these movements. The rear wheels 14, suspended so that they swing, must follow these movements. Simultaneously, the pendulum shield 56 swings about the pendulum axis 58, as indicated by the arrow in FIG. 2. Here, the second angular gear 96 moves with the pendulum shield 56. The movement of the second angular gear 96 relative to the first angular gear 82 is enabled by the telescoping drive shaft 86 equipped with two universal joints 88 and 94. The feeding and picking devices are driven by the internal combustion engine 54 over the shaft 84 of the top feeder house roller 48, the first angular gear 82, the telescoping drive shaft 86, the second angular gear 96, the header drive shaft 98, the pinion 102, the chain 100, the pinion 104, the drive shaft 78, and the angular gear 80.

Due to the attachment of the header drive shaft 98 to the pendulum shield 56, the drive connection between the header drive shaft 98 and the drive shaft 78 of the header 42 must not allow relative motion between the mentioned shafts 98 and 78, which is different from the prior art, in which the header drive shaft 98 is mounted on the housing of the feeder house 38. Therefore, the configuration can be relatively simple and cost effective. In addition, a production of different variants of headers 42 for a combine 10 with or without slope equipment can be eliminated, because the drive shaft 78 can be connected to the drive connection between the header drive shaft 98.

A second embodiment of the drive train for the header 42 is shown in FIG. 3. Elements matching those of the first embodiment are designated with the same reference numbers.

The shaft 84 of the top feeder house roller 48, which is likewise driven by the internal combustion engine 54 and which is used as the header drive shaft, is in drive connection with a toothed gear wheel drive 106, which drives a cross shaft 108. The cross shaft 108 drives the first angular gear 82, whose housing is mounted above the housing 44 of the feeder house 38. From the first angular gear 82, a connection shaft 108, which is in drive connection with the second angular gear 96, extends forwards and down. The connection shaft 108 need not have a telescoping configuration equipped with universal joints, which is different from that shown in FIG. 3, since its longitudinal axis and the pendulum axis 58 are arranged coaxially. The housing of the second angular gear 96 is mounted on the pendulum shield 56, and its collar 110, extending backwards, is enclosed by a not-shown bearing, which is connected to the housing 44 of the feeder house 38. The housing of the second angular gear 96 is thus part of the pendulum bearing of the pendulum shield 56.

From the second angular gear 96, the header drive shaft 98 extends horizontally and perpendicular to the direction of travel up to the two sides of the pendulum shield 56. There, pinions 112 are attached, which drive, via chains 114 and additional pinions 116, the gear train 118 of the header 42, which is in drive connection with the drive shaft 78 of the header 42. The drive shaft 78 is thus driven by the shaft 84, the toothed wheel 106, the cross shaft 108, the first angular gear 82, the connection shaft 108, the second angular gear 96, the header drive shaft 98, the pinion 112, the chain 114, the pinion 116, and the toothed gearing 118. Instead of the chain drive, some other drive connection can also be used.

With reference to FIG. 3, it can be further seen that the header 42 is assembled from a center part 120 and two side parts 122 and 124, which can be swung upwards and inwards for transport on a road, as indicated by arrow 136. The side parts 122 and 124 have drive shafts 126, which can be coupled by coupling halves 128 and 130 with the drive shaft 78 of the center part 120. When the side parts 122 and 124 are swung into the transport position, the coupling halves 128 and 130 automatically separate and they reconnect in drive connection when the side parts 122 and 124 are swung down again for harvesting.

The embodiment of the drive system of the header 42 illustrated in FIG. 3 enables the side parts 122 and 124 to swing into the transport position, also for a header 42 suitable for use on a combine 10 with slope equipment, without requiring a separation of the drive connection between the header drive shaft 98 and the drive shaft 78 of the header 42. The operator thus does not need to come down from the driver cabin 16 to release the drive connection, which significantly accelerates the transition between harvesting and transport positions of the header 42. Obviously, the header shown in FIG. 1 can also be equipped with side parts 122 and 124 that can swing upwards, whose drive shafts can be connected in a removable way by coupling halves 128 and 130 to the drive shaft 78 of the center part 120, because there the drive shaft 78 is also driven in the vicinity of the pendulum shield 56, and thus at the center part.

In FIG. 3, the drive train of a header 42 according to the state of the art is also shown with dashed lines. It includes a connection 132, which extends out from the shaft of the lower feeder house roller 46 and which is connected over a telescoping drive shaft to a connection 134 on the outer side of the side part 124. The telescoping drive shaft is necessary to enable the pendulum-like motion of the header 42 about the pendulum axis 58. Thus, the state of the art requires a removal of the drive shafts, which is made unnecessary by the invention.

A conventional header can be attached to the header drive shaft 98 or to the connection 132, if the latter is provided on the combine 10 with a drive train of the header for this purpose according to the invention.

Having described the illustrated embodiments, it will become apparent that various modifications can be made without departing from the scope of the invention as defined in the accompanying claims.

The invention claimed is:

1. A harvesting machine having a direction of travel comprising:
  a main frame;
  a feeder house being mounted to the main frame, the feeder house having a front face with a mounting device, the mounting device is movable with respect to the main frame; and a header being releasably mounted to the mounting device;

a drive train comprising a header drive shaft supported from the mounting device and driven by the harvesting machine, a secondary drive shaft driven by the header drive shaft and supplying power to the header, the secondary drive shaft being mounted on the header and the header drive shaft being mounted on the mounting device and supported by the mounting device when the header is released from the mounting device, wherein the header drive shaft extends horizontal and perpendicular to the direction of travel; and Wherein the mounting device is hinged on the feeder house so that it can pivot about a pendulum axis extending at least approximately in the direction of the harvesting machine.

2. The harvesting machine as defined by claim 1 wherein the header drive shaft is connected to a harvesting machine drive shaft that drives the header drive shaft by a connection shaft extending in the direction of travel.

3. A harvesting machine having a direction of travel comprising:

a main frame;

a feeder house being mounted to the main frame, the feeder house having a front face with a mounting device, the mounting device is movable with respect to the main frame;

a header being releasably mounted to the mounting device;

a drive train comprising a header drive shaft being driven by the harvesting machine, the header drive shaft drives a secondary drive shaft for supplying power to the header, the secondary drive shaft being mounted on the header and the header drive shaft being mounted on the mounting device;

wherein the header drive shaft extends horizontal and perpendicular to the direction of travel;

wherein the header drive shaft is connected to a harvesting machine drive shaft that drives the header drive shaft by a connection shaft extending in the direction of travel; and wherein the mounting device is hinged on the feeder house so that it can pivot about a pendulum axis extending at least approximately in the direction of travel of the harvesting machine.

4. The harvesting machine as defined by claim 3 wherein the connection shaft extends coaxially to the pendulum axis.

5. The harvesting machine as defined by claim 3 wherein the connection shaft is a drive shaft of variable length.

* * * * *